US009497378B1

(12) United States Patent
Lee et al.

(10) Patent No.: US 9,497,378 B1
(45) Date of Patent: Nov. 15, 2016

(54) ELECTRONIC DEVICE AND MEHOD FOR CONTROLLING OPERATION OF COOKING EQUIPMENT

(71) Applicant: HON HAI PRECISION INDUSTRY CO., LTD., New Taipei (TW)

(72) Inventors: Hou-Hsien Lee, New Taipei (TW);
Chang-Jung Lee, New Taipei (TW);
Chih-Ping Lo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/794,953

(22) Filed: Jul. 9, 2015

(51) Int. Cl.
H04N 5/228 (2006.01)
H04N 5/232 (2006.01)
H05B 6/06 (2006.01)
A47J 37/12 (2006.01)
H05B 6/80 (2006.01)
H05B 6/64 (2006.01)

(52) U.S. Cl.
CPC ....... *H04N 5/23222* (2013.01); *A47J 37/1266* (2013.01); *H04N 5/23229* (2013.01); *H05B 6/06* (2013.01); *H05B 6/6447* (2013.01); *H05B 6/80* (2013.01); *H05B 2206/02* (2013.01); *H05B 2206/04* (2013.01)

(58) Field of Classification Search
CPC ............... H04N 5/23222; H04N 5/23229;
H04N 7/181; H04N 7/183; H05B 6/06;
H05B 6/80; H05B 6/6447; H05B 2206/04;
H05B 2206/02; A47J 37/1266
USPC ..................... 348/142–160, 222.1
See application file for complete search history.

(56) References Cited

U.S. PATENT DOCUMENTS

2004/0107957 A1* 6/2004 Nishida ................ A23L 1/0107
126/391.1
2010/0182136 A1* 7/2010 Pryor ................... G01F 23/292
340/425.5

* cited by examiner

*Primary Examiner* — Yogesh Aggarwal
(74) *Attorney, Agent, or Firm* — Zhigang Ma

(57) ABSTRACT

In a method for controlling the operation of cooking equipment, executed by at least one processor of an electronic device, the electronic device communicate with cooking equipment and a camera device that creates height value. The method including setting the camera device to detect an area of a container positioned on the cooking equipment, a liquid concentration of liquid in the container is set, height values between the camera device and a surface of the liquid, in a Z axis direction corresponding to a direction that is parallel to a direction between the camera device and the surface, from the camera device is acquired, a height difference between a maximum height value and a minimum height value is calculated, and when the height value difference is more than a preset standard value, a heat reduction unit of the cooking equipment is controlled to change a working state.

18 Claims, 13 Drawing Sheets

ELECTRONIC DEVICE AND MEHOD FOR CONTROLLING OPERATION OF COOKING EQUIPMENT

FIELD

The subject matter herein generally relates to smart device control technology.

BACKGROUND

Cooking equipment, for example, a household gas stove, can be used for cooking food. However, when liquid in a container has been boiled away under a situation of no one to look after the cooking, there is risk of fire or explosion.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
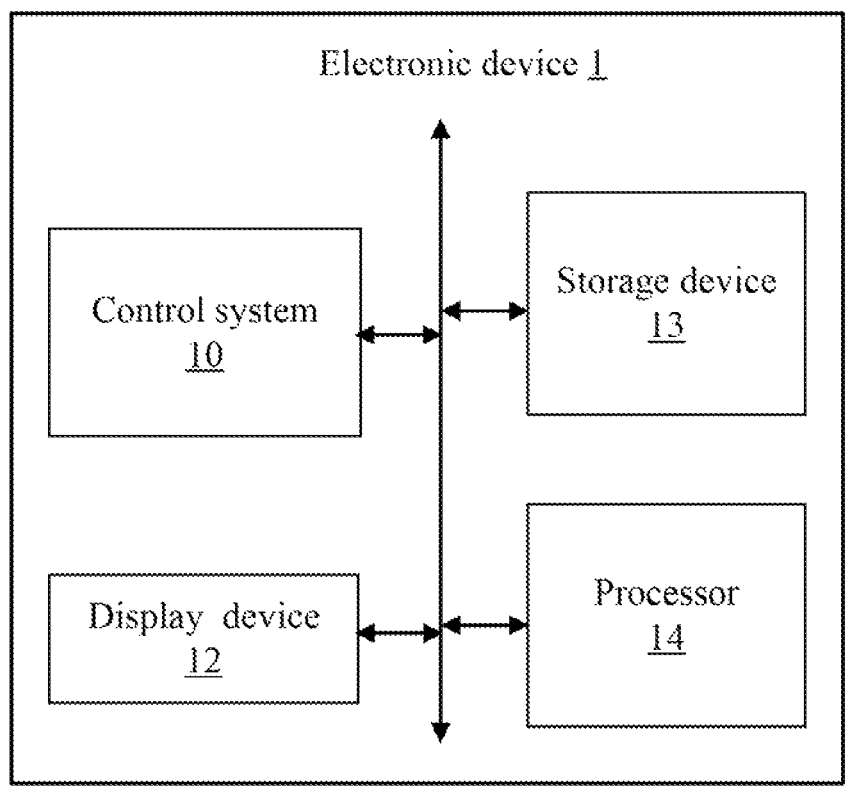
FIG. 1 is a block diagram of an example embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives. The term "comprising" means "including, but not necessarily limited to"; it specifically indicates open-ended inclusion or membership in a so-described combination, group, series and the like.

FIG. 1 is a block diagram of an example embodiment of an electronic device. In at least one embodiment as shown in FIG. 1, the electronic device 1 includes, but is not limited to, a control system 10, a display device 12, a storage device 13, and at least one processor 14. The electronic device 1 can be a mobile phone, a tablet computer, a personal digital assistant, a digital television, or any other electronic device. FIG. 1 illustrates only one example of the electronic device, other examples can include more or fewer components than as illustrated, or have a different configuration of the various components in other embodiments.

In at least one embodiment, the storage device 13 can include various types of non-transitory computer-readable storage mediums. For example, the storage device 14 can be an internal storage system, such as a flash memory, a random access memory (RAM) for temporary storage of information, and/or a read-only memory (ROM) for permanent storage of information. The storage device 13 can also be an external storage system, such as a hard disk, a storage card, or a data storage medium.

In at least one embodiment, the at least one processor 14 can be a central processing unit (CPU), a microprocessor, or other data processor chip that performs functions of the electronic device 1. The processor 14 can control a working state of cooking equipment 3, for example, stopping or reducing heating when liquid in a container 4 is boiling. It may be understood that, the container 4 can be used for holding the liquid and the container 4 can position on the cooking equipment 3. The container 4 can be a toughened glass pot, a ceramic pot, or an iron pan.

In at least one embodiment, the control system 10 can change a working state of the cooking equipment 3 by analyzing height difference of the liquid in the container 4. When the height difference is not more than a preset standard value, the cooking equipment 3 can be allowed to continue its heating function.

Figure 2:
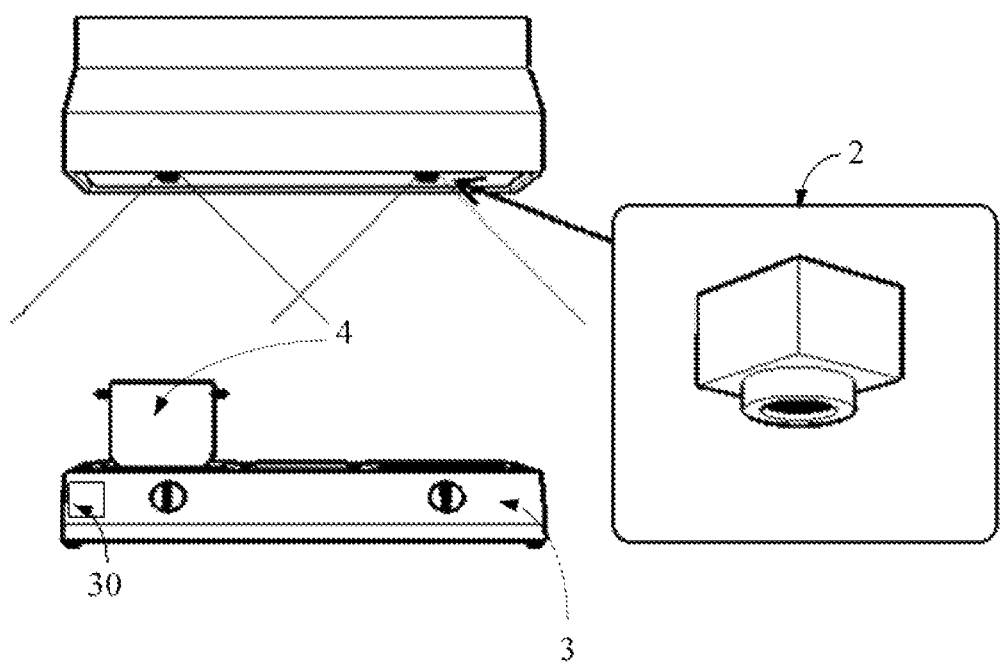
FIG. 2 is a diagrammatic view of a first example embodiment of a positioning of a camera device.
Figure 3:
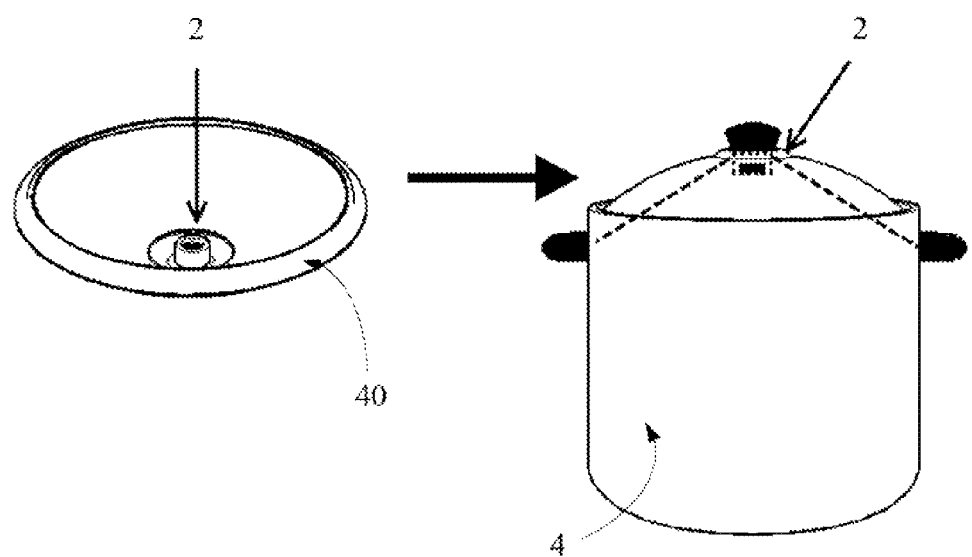
FIG. 3 is a block diagram of a second example embodiment of the positioning of a camera device.

FIG. 2 is a diagrammatic view of a first example embodiment of a positioning of a camera device. In at least one embodiment as shown in FIG. 2, the camera device 2 can be positioned above the cooking equipment 3. In another embodiment, the camera device 2 can be positioned on a lid 40 of the container 4, as shown in FIG. 3. The camera device 2 can be a time-of-flight camera (TOF camera). The TOF camera is a camera system that creates height value data. The scene is illuminated by short light pulses and the camera measures the time taken until the reflected light returns to the camera. This time is directly proportional to the height value. The camera therefore provides height values for each pixel of the liquid in the container 4. The time-of-flight principle is similar to that of 3D scanners with the advantage that whole scene is captured at the same time. The camera device 2 can be waterproof and heat-resistant.

In at least one embodiment, the camera device 2 can wirelessly communicate with the electronic device 1. That is to say, the camera device 2 can acquire height values between the camera device 2 and a surface of the liquid in the container 4, in a Z axis direction corresponding to a direction that is parallel to a direction between the camera device 2 and the surface. The camera device 2 can transmit the height values to the electronic device 1.

In at least one embodiment, the cooking equipment 3 can comprise a heat source and a heat reduction unit 30 positioned in a furnace body of the cooking equipment 3. The heat reduction unit 30 can be used to control heat output of the cooking equipment 3. The heat reduction unit 30 can comprise a communication interface for communicating with the electronic device 1. In some embodiments, the cooking equipment 3 can be an induction cooker, an electric frying stove, an infrared oven, a microwave oven, or a gas furnace. In FIG. 2, the camera device 2 can be positioned above the container 4. When the camera device 2 needs to acquire height values between the camera device 2 and the surface of the liquid, the lid 40 of the container 4 should be taken away. That is to say, the liquid must be heated in the container 4 without the lid 40. In at least one embodiment, the camera device 2 can communicate through wires or wirelessly with the electronic device 1.

Figure 4:
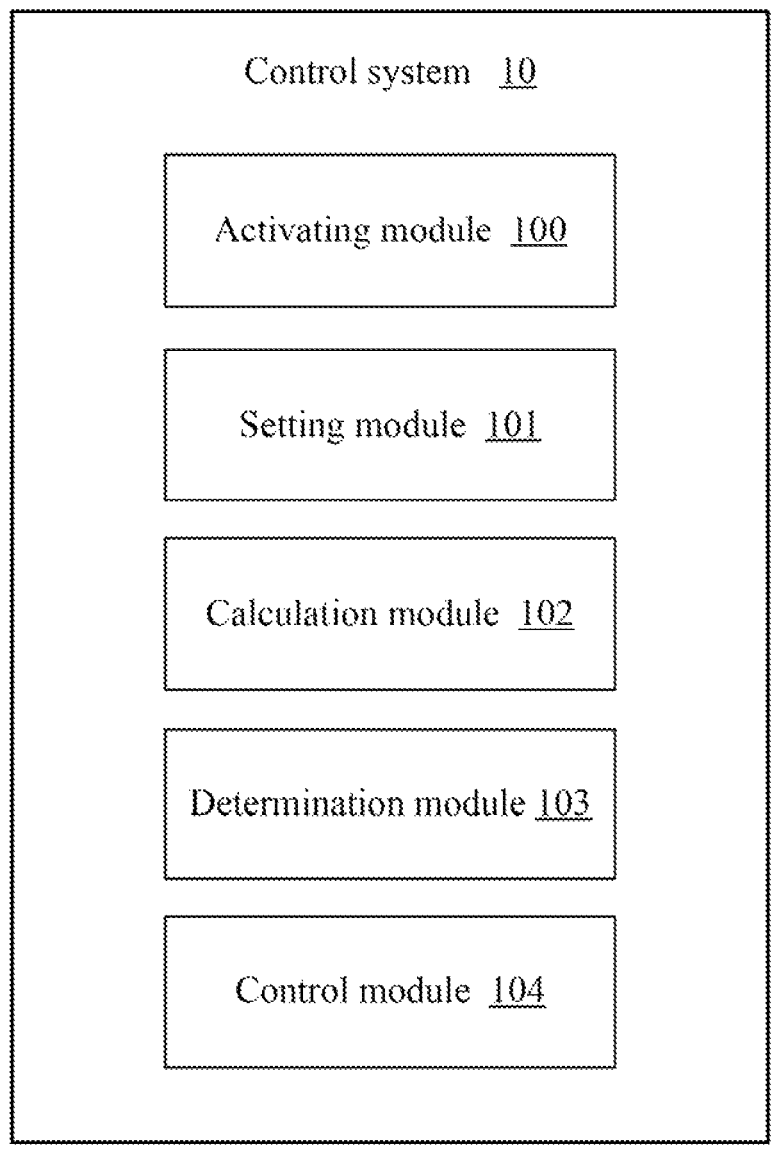
FIG. 4 is a block diagram of an example embodiment of function modules of a control system.

FIG. 4 is a block diagram of one embodiment of function modules of the control system. In at least one embodiment, the control system 10 can include an activating module 100, a setting module 101, a calculation module 102, a determination module 103, and a control module 104. The function modules 100, 101, 102, 103, and 104 can include computerized codes in the form of one or more programs which are stored in the storage device 13. The at least one processor 14 executes the computerized codes to provide functions of the function modules 100-104.

Figure 5:
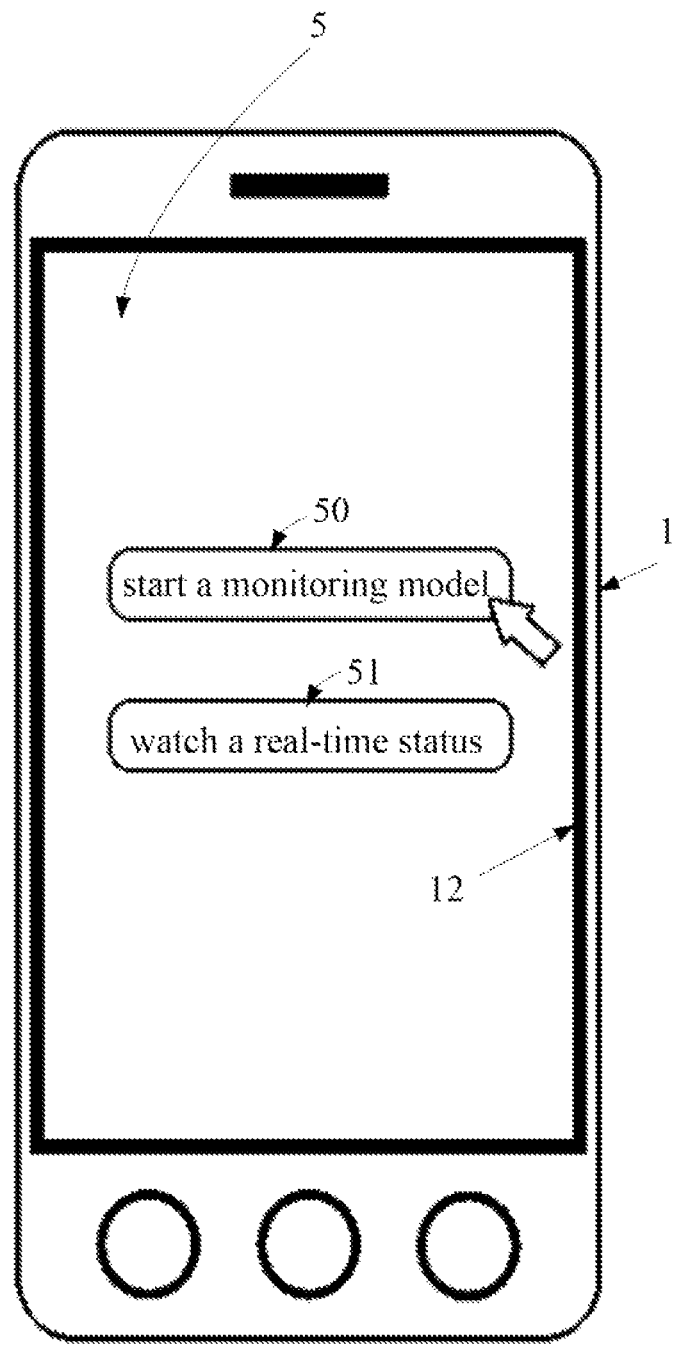
FIG. 5 is a diagrammatic view of an example embodiment of a user interface of the control system.

The activating module 100 can activate a smart control system interface 5, in response to a touch on the smart control system icon displayed on the display device 12. In some embodiments, the smart control system interface 5 can display two buttons: "start a monitoring model" 50, and "watch a real-time status" 51, as shown in FIG. 5.

Figure 6:
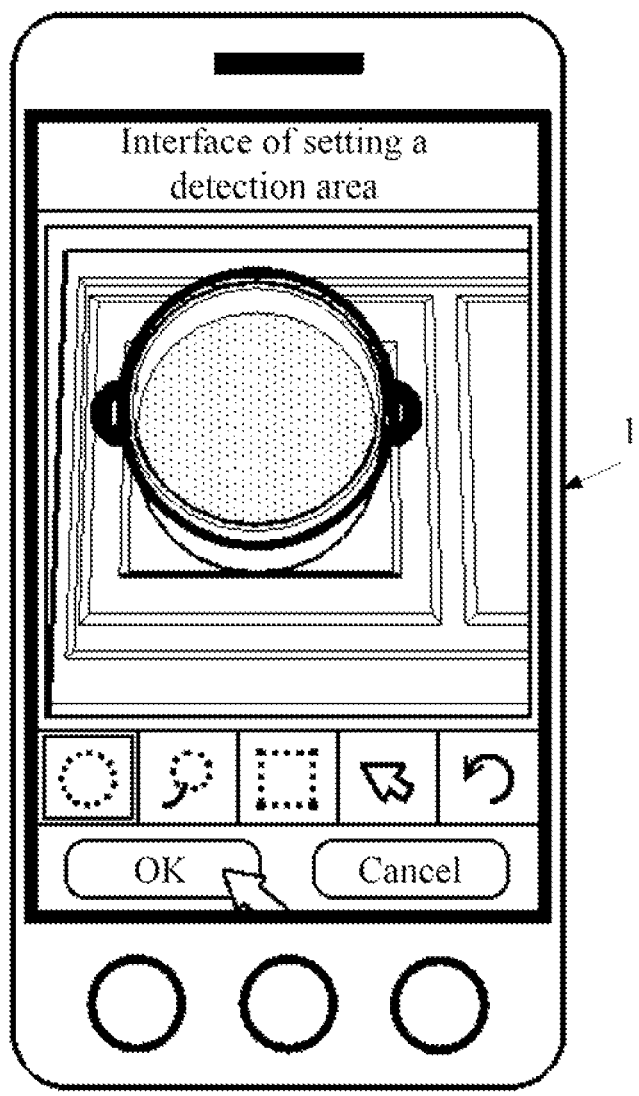
FIG. 6 is a diagrammatic view of an example embodiment of a user interface to set a detection area.

The setting module 101 can set the camera device 2 to detect an area of the container 4 and a liquid concentration of liquid in the container 4 when the button of "start a monitoring model" 50 is pressed. In at least one embodiment, the area detected by the camera device 2 (hereinafter referred to as a detection area) can be a target zone that the user wants to observe or monitor. Once the detection area has been set, the camera device 2 can record activity in the detection area in the container 4. FIG. 6 shows an interface for setting a detection area. The detection area can be set as a round area or a square area. The detection area can be moved and changed.

Figure 7:
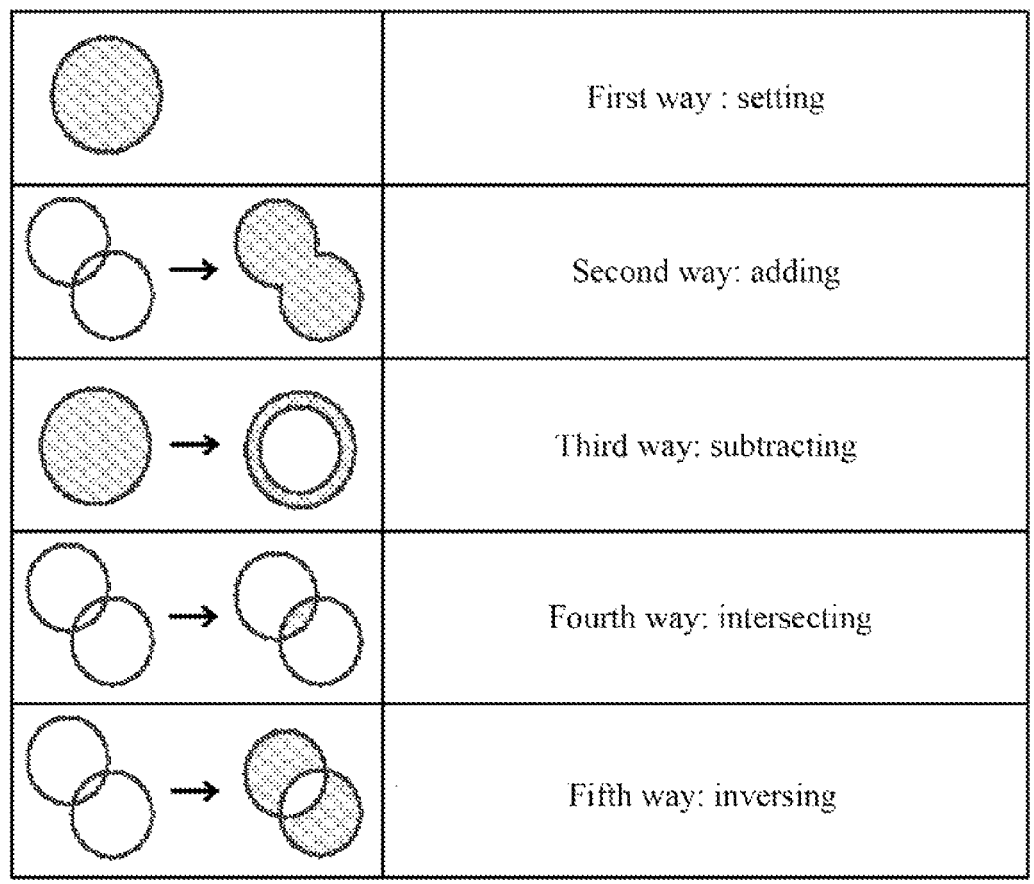
FIG. 7 is a diagrammatic view of an example embodiment of five ways of setting a detection range.

In at least one embodiment, there are five ways for setting a detection area, including setting, adding, subtracting, intersecting, and inversing, as shown in FIG. 7. The five ways not only can be used to set a suitable detection area in a more flexible way, but also improve efficiency and save time without calculating and analyzing "irrelevant areas". As shown in FIG. 7, "adding" means that a first area and a second area can overlap, so a detection area is the overlapped area plus the remaining of the second area and the remaining of the first area. "Subtracting" means that a second area can be fully contained in a first area, so a detection area is the first area with the second area subtracted. "Intersecting" means a first area and a second area can overlap, so a detection area is the overlapped area. "Inversing" means a detection area is the first and second areas minus any area of overlap.

Figure 8:
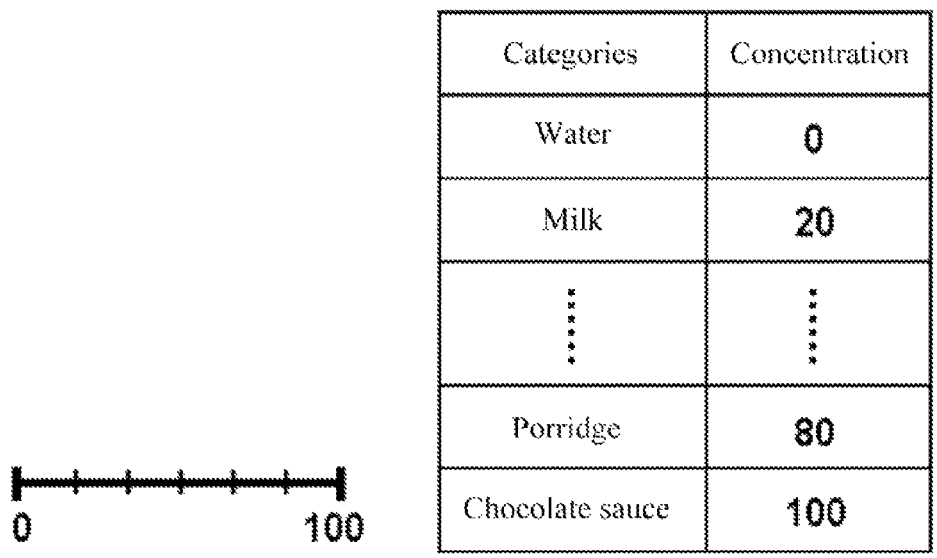
FIG. 8 is a diagrammatic view of an example embodiment of a predetermined relationship between substance categories and liquid concentrations.
Figure 9:
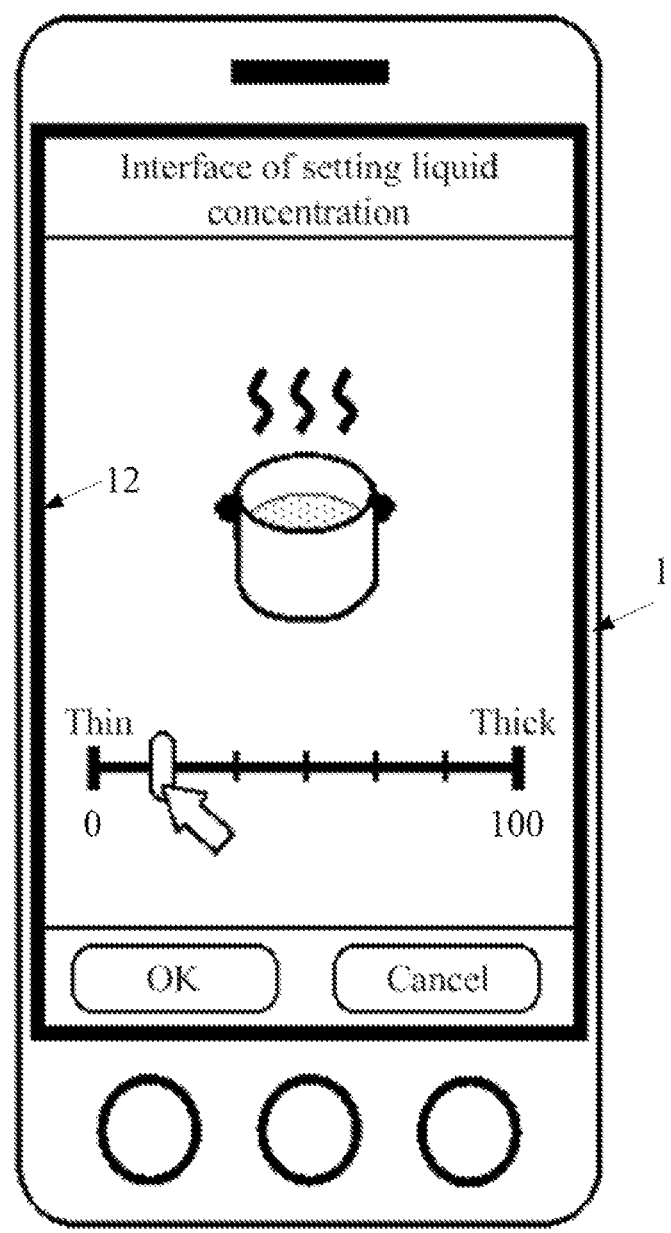
FIG. 9 is a diagrammatic view of an example embodiment of a user interface to set liquid concentration.

In at least one embodiment, the liquid concentration can be set according to a predetermined relationship between substance categories and liquid concentrations stored in the storage device 13. In FIG. 8, concentration of pure water can be set to zero, concentration of pure milk can be set to 20 percent, concentration of porridge can be set to 80 percent, and concentration of chocolate sauce can be set to 100 percent. A value of height difference can be calculated by a maximum height value minus a minimum height value. The maximum height value is measured to a lowest point on the surface, and the minimum height value is measured to a highest point on surface. As liquids are different, preset standard values are different. That is to say, when a liquid concentration is low, a preset standard value is large, but when a liquid concentration is high, a preset standard value is small. For example, a standard value of pure water is preset to 20 millimeters; a standard value of chocolate sauce is preset to 5 millimeters. An interface for setting liquid concentrations is shown in FIG. 9.

The calculation module 102 can calculate a height difference between a maximum height value and a minimum height value received from the camera device 2 when the liquid in the container 4 being heated. The maximum height value is measured to a lowest point on the surface, and the minimum height value is measured to a highest point on surface.

In at least one embodiment, before calculating the height difference, the electronic device 1 acquires height values between the camera device 2 and the surface of the liquid from the camera device 2, in a Z axis direction corresponding to a direction that is parallel to a direction between the camera device 2 and the surface. The coordinates of X and Y axes not being required by the camera 2.

When the electronic device 1 receives the height values of the Z axis direction from the camera device 2, the calculation module 102 can calculate a height difference.

Figure 10:
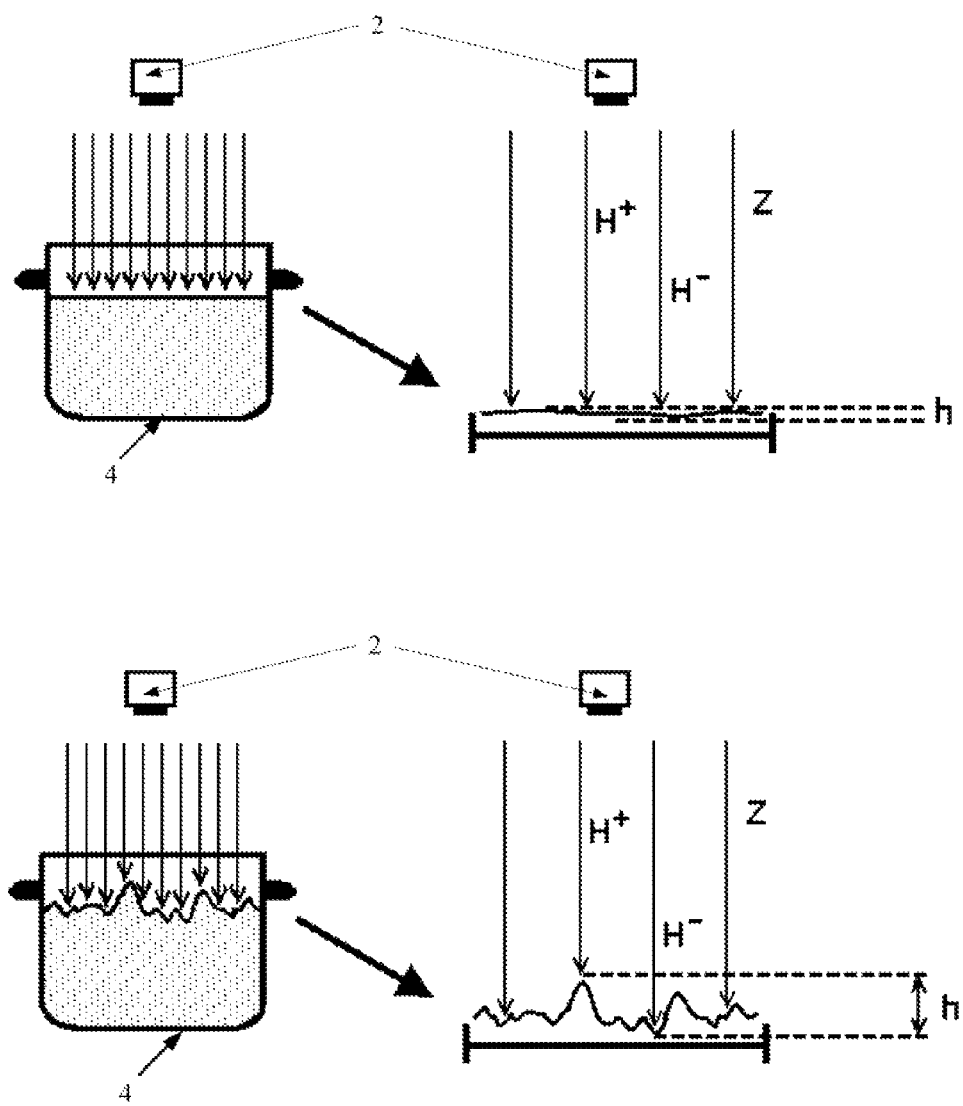
FIG. 10 is a diagrammatic view of a first example embodiment of a height value.

In one embodiment, as shown in FIG. 10, the camera device 2 is positioned above the container 4 (shown in FIG. 2) and the height values of the Z axis direction are acquired by the camera device 2. When the liquid in the container 4 is not being heated, the height values of the Z axis direction are the same or almost the same. When the liquid in the container 4 is boiling, the height values of the Z axis direction can be very different. For example, from the point of view of the camera 2, "H−" can refer to a maximum height value which is from the camera device 2 to a lowest point on the surface of the liquid, and "H+" can refer to a minimum height value which is from the camera device 2 to a highest point on the surface of the liquid. The height difference can be calculated by "H−" minus "H+".

Figure 11:
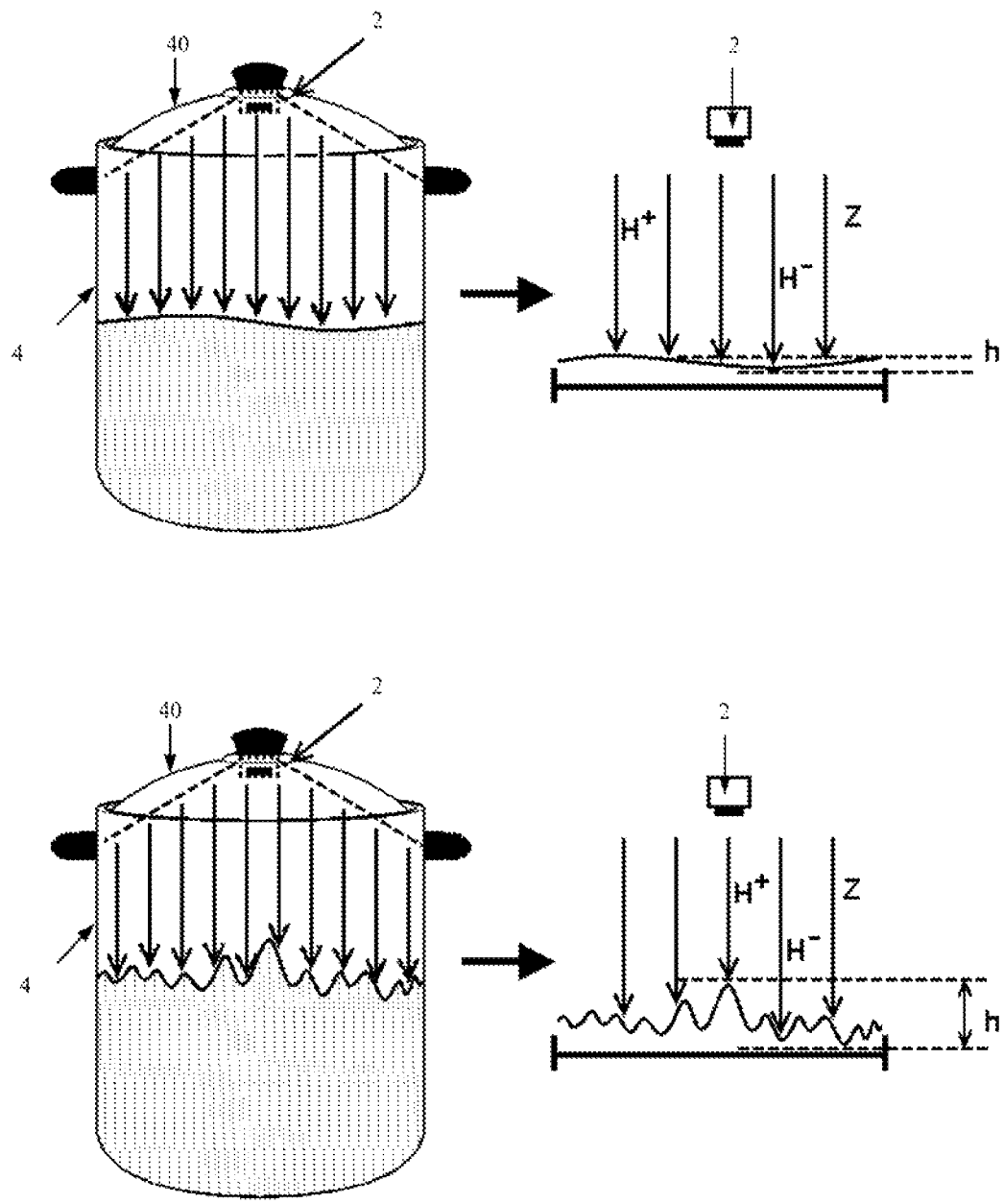
FIG. 11 is a diagrammatic view of a second example embodiment of a height value.

In another embodiment, as shown in FIG. 11, the camera device 2 is positioned on the lid 40 of the container 4 (as shown in FIG. 3) and height values of the Z axis direction are acquired by the camera device 2. The circumstances of this embodiment and the process of calculation of height difference are the same as in the previous embodiment.

The determination module 103 can determine whether the height difference is more than a preset standard value. When a determination is made that the height difference is more than a preset standard value, the heat or energy output from the cooking equipment 3 should be switched off or reduced. When a determination is made that the height difference is not more than a preset standard value, the heat or energy output does not need to be changed.

The control module 104 can control the heat reduction unit 30 of the cooking equipment 3 to change a working state of the cooking equipment 3, when the value of height difference is more than a preset standard value. In some embodiments, the working state of the cooking equipment 3 can comprise a reduced heat or energy output or entirely shutting off the heat or energy.

Figure 12:
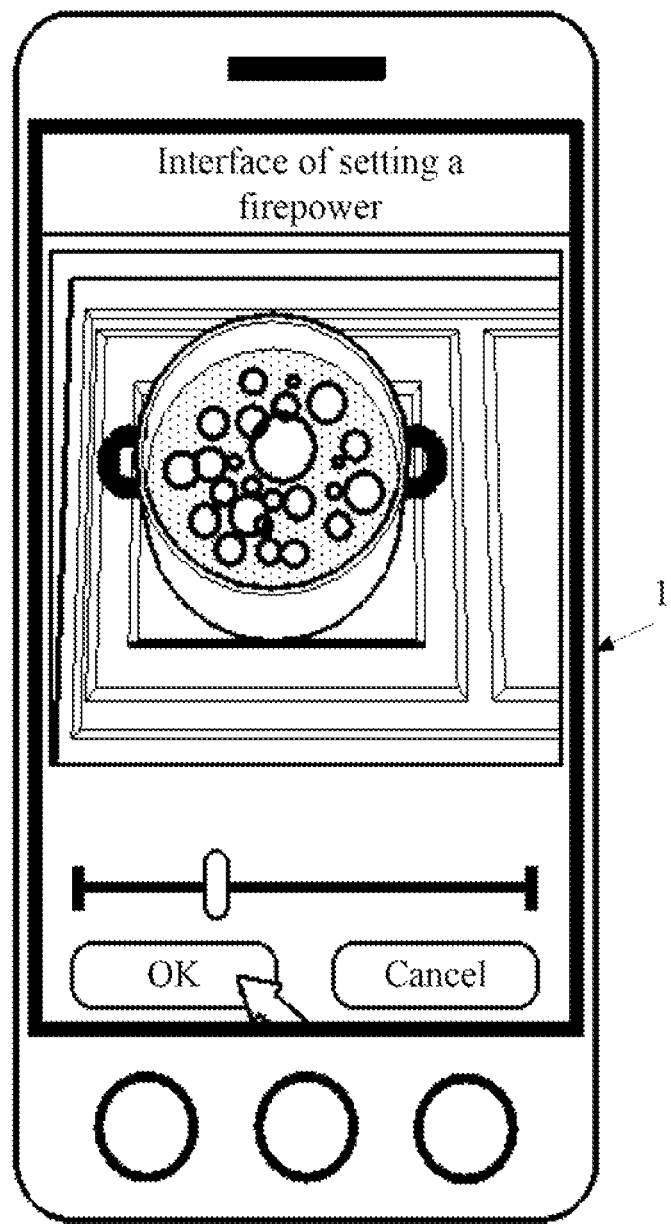
FIG. 12 is a diagrammatic view of an example embodiment of a user interface for controlling the heat of cooking.

In some embodiments, the setting module 101 can also set heat or energy output of the cooking equipment 3, when the button of "watch a real-time status" 51 is pressed. When the button of "watch a real-time status" 51 is pressed, the user can see an actual state of the liquid in the container 4 from images acquired by the camera device 2. When the liquid is boiling, the user can set or reset the heat or energy output through a user interface. The user interface is displayed on the display device 12 of the electronic device 1. When the heat or energy output of the cooking equipment 3 is set, the control module 104 can control the heat reduction unit 30 of the cooking equipment 3 to change a working state of the cooking equipment 3. The interface for setting heat or energy output is shown in FIG. 12.

Figure 13:
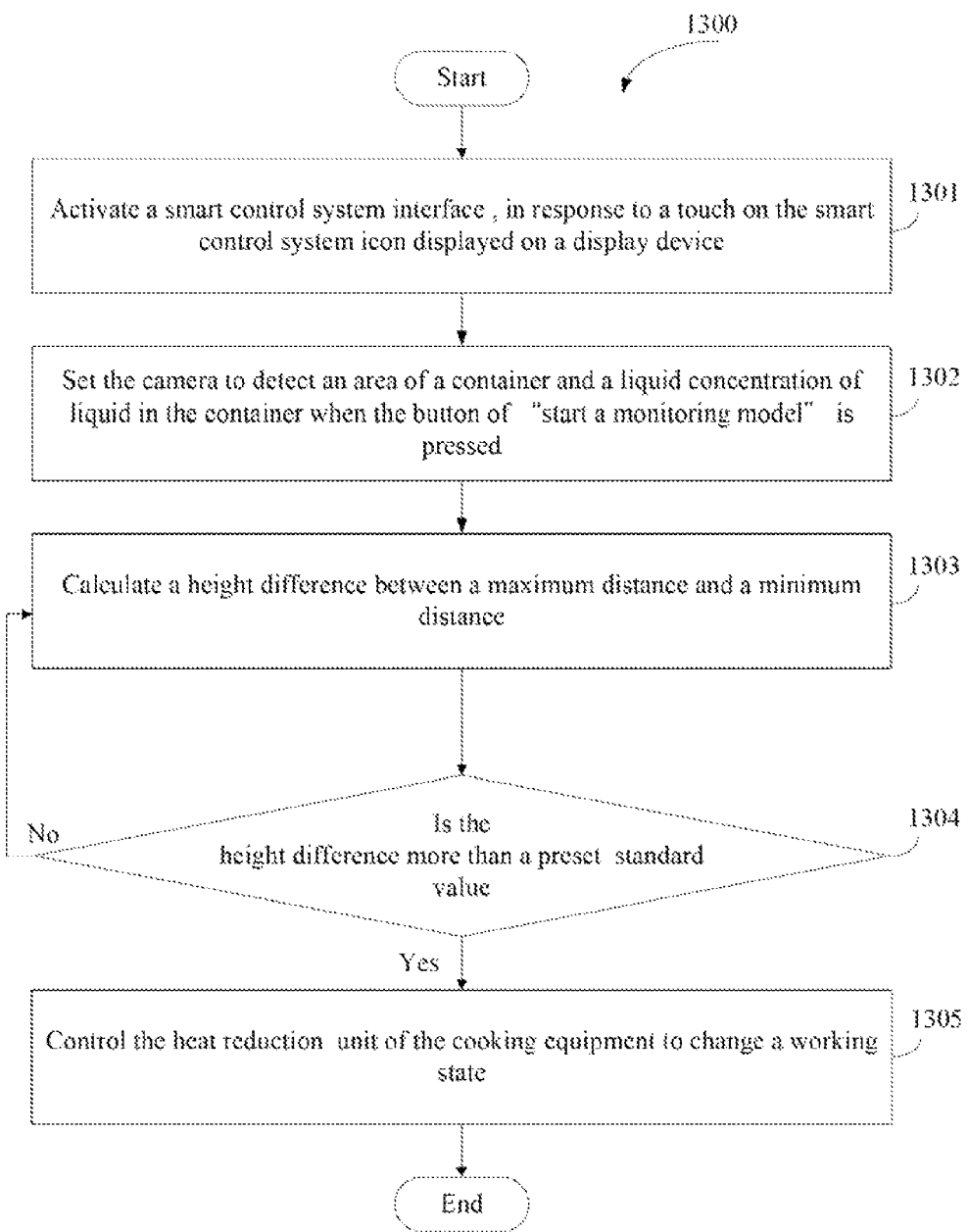
FIG. 13 is a flowchart of an example embodiment of a method for controlling the cooking equipment by an electronic device.

FIG. 13 illustrates a flowchart in accordance with an example embodiment. An example method 1300 is provided by way of example, as there are a variety of ways to carry out the method. The example method 1300 described below can be carried out using the configurations illustrated in FIG. 1 and FIG. 4, and various elements of these figures are referenced in explaining the example method. Each block shown in FIG. 13 represent one or more processes, methods, or subroutines carried out in the example method 1300. Furthermore, the illustrated order of blocks is illustrative only and the order of the blocks can be changed. The example method 1300 can begin at block 1301. Depending on the embodiment, additional blocks can be utilized and the ordering of the blocks can be changed.

At block 1301, an activating module activates a smart control system interface 5, in response to a touch on the smart control system icon displayed on the display device 12.

At block 1302, a setting module sets the camera device 2 to detect an area of the container 4 positioned on the cooking equipment 3 and a liquid concentration of liquid in the container 4 according to a predetermined relationship between substance categories and liquid concentrations, when the button of "start a monitoring model" 50 is pressed.

At block 1303, a calculation module calculates a height difference between a maximum height value and a minimum height value acquired from the camera device 2 when the liquid in the container 4 being heated.

At block 1304, determination module 103 can determine whether the height difference is more than a preset standard value. If the height difference is more than a preset standard value the process goes to block 1305. If the height difference is not more than a preset standard value the process returns to block 1303.

At block 1305, a control module controls the heat reducing unit of the cooking equipment 3 to change a working state of the cooking equipment 3.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for controlling the operation of cooking equipment being executed by at least one processor of an electronic device, the electronic device communicating with cooking equipment and a camera device that creates height value, the method comprising:
   setting the camera device to detect an area of a container positioned on the cooking equipment;
   setting a liquid concentration of liquid in the container according to a predetermined relationship between substance categories and liquid concentrations;
   acquiring height values between the camera device and a surface of the liquid, in a Z axis direction corresponding to a direction that is parallel to a direction between the camera device and the surface, from the camera device;
   calculating a height difference between a maximum height value and a minimum height value, wherein the maximum height value is measured to a lowest point on the surface and the minimum height value is measured to a highest point on surface; and
   controlling, when the height difference is more than a preset standard value, a heat reduction unit of the cooking equipment to change a working state of the cooking equipment.

2. The method according to claim 1, further comprise:
   activating a smart control system interface displayed on a display device of the electronic device in response to a touch on a smart control system icon displayed on the display device, before setting the camera device to detect the area.

3. The method according to claim 1, wherein the camera device is positioned above the container or on a lid of the container.

4. The method according to claim 1, wherein there are five ways for setting the camera device to detect the area including setting, adding, subtracting, intersecting, and inversing.

5. The method according to claim 1, wherein a preset standard value is large when a liquid concentration is low, and a preset standard value is small when a liquid concentration is high.

6. The method according to claim 1, wherein the working state of the cooking equipment comprises a reduced heat or energy output or entirely shutting off the heat or energy.

7. An electronic device, communicating with cooking equipment and a camera device that creates height value, comprising:
   a display device;
   at least one processor coupled to the display device; and
   a storage device coupled to the at least one processor and storing one or more programs executable by the at least one processor to cause the at least one processor to:

set the camera device to detect an area of a container positioned on the cooking equipment;

set a liquid concentration of liquid in the container according to a predetermined relationship between substance categories and liquid concentrations;

acquire height values between the camera device and a surface of the liquid, in a Z axis direction corresponding to a direction that is parallel to a direction between the camera device and the surface, from the camera device;

calculate a height difference between a maximum height value and a minimum height value, wherein the maximum height value is measured to a lowest point on the surface and the minimum height value is measured to a highest point on surface; and control, when the height difference is more than a preset standard value, a heat reduction unit of the cooking equipment to change a working state of the cooking equipment.

8. The electronic device according to claim 7, further comprise:

activate a smart control system interface displayed on the display device in response to a touch on a smart control system icon displayed on the display device, before setting the camera device to detect the area.

9. The electronic device according to claim 7, wherein the camera device is positioned above the container or on a lid of the container.

10. The electronic device according to claim 7, wherein there are five ways for setting the camera device to detect the area including setting, adding, subtracting, intersecting, and inversing.

11. The electronic device according to claim 7, wherein a preset standard value is large when a liquid concentration is low, and a preset standard value is small when a liquid concentration is high.

12. The electronic device according to claim 7, wherein the working state of the cooking equipment comprises a reduced heat or energy output or entirely shutting off the heat or energy.

13. A non-transitory storage medium having stored thereon instructions that, when executed by a processor of an electronic device, causes the processor to perform a controlling method using the electronic device, the electronic device communicating with cooking equipment and a camera device that creates height value, the method comprising:

setting the camera device to detect an area of a container positioned on the cooking equipment;

setting a liquid concentration of liquid in the container according to a predetermined relationship between substance categories and liquid concentrations;

acquiring height values between the camera device and a surface of the liquid, in a Z axis direction corresponding to a direction that is parallel to a direction between the camera device and the surface, from the camera device;

calculating a height difference between a maximum height value and a minimum height value, wherein the maximum height value is measured to a lowest point on the surface and the minimum height value is measured to a highest point on surface; and controlling, when the height difference is more than a preset standard value, a heat reduction unit of the cooking equipment to change a working state of the cooking equipment.

14. The non-transitory storage medium according to claim 13, further comprise:

activating a smart control system interface displayed on a display device of the electronic device in response to a touch on a smart control system icon displayed on the display device, before setting the camera device to detect the area.

15. The non-transitory storage medium according to claim 13, wherein the camera device is positioned above the container or on a lid of the container.

16. The non-transitory storage medium according to claim 13, wherein there are five ways for setting the camera device to detect the area including setting, adding, subtracting, intersecting, and inversing.

17. The non-transitory storage medium according to claim 13, wherein a preset standard value is large when a liquid concentration is low, and a preset standard value is small when a liquid concentration is high.

18. The non-transitory storage medium according to claim 13, wherein the working state of the cooking equipment comprises a reduced heat or energy output or entirely shutting off the heat or energy.

* * * * *